United States Patent Office 3,301,326
Patented Jan. 31, 1967

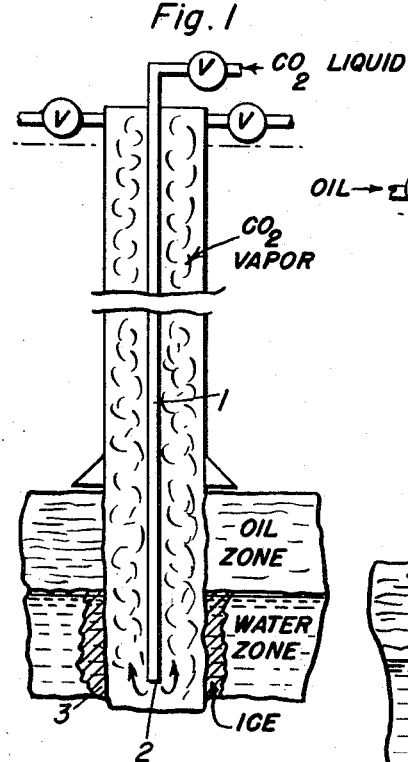
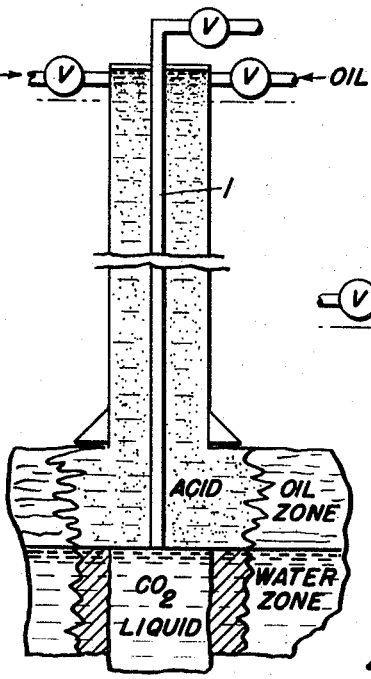
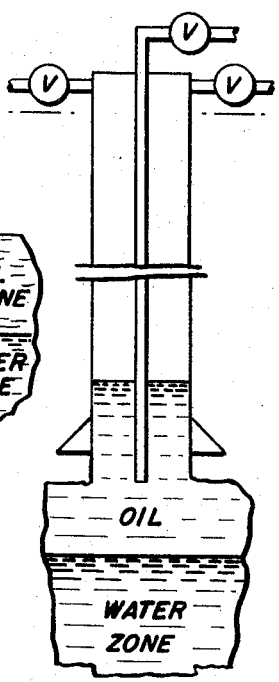
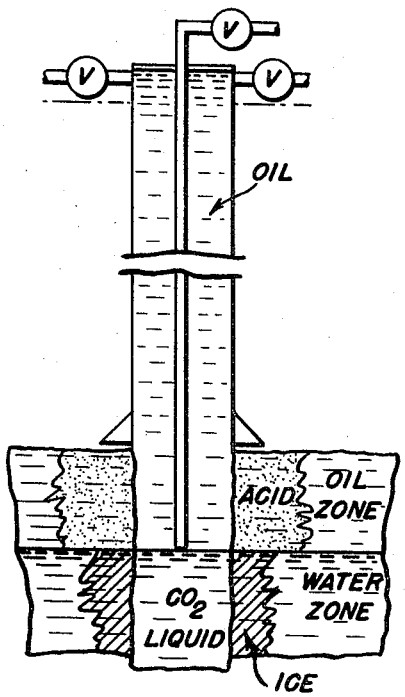

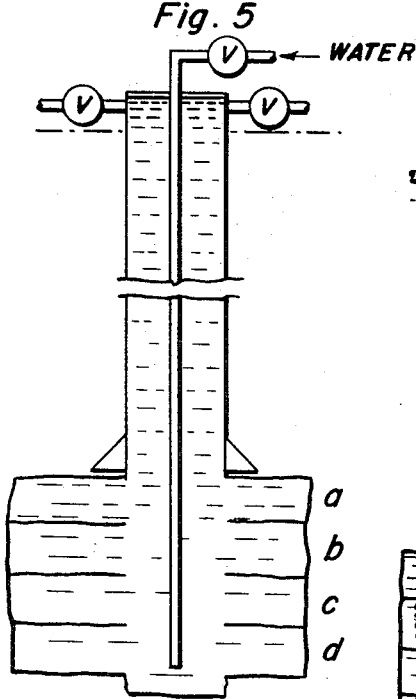
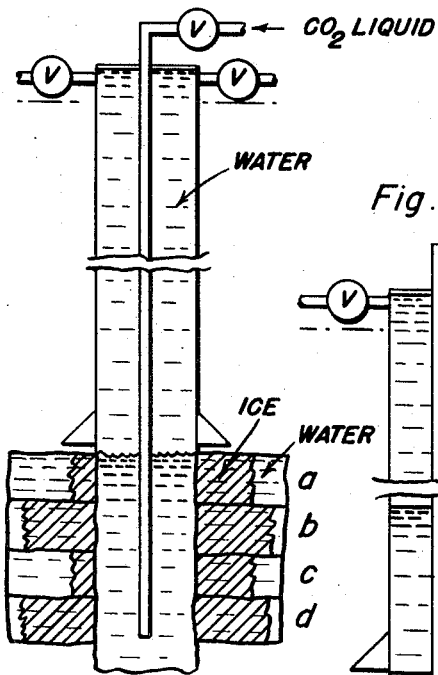
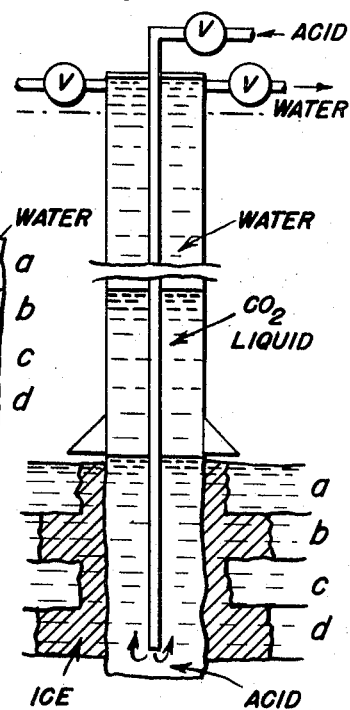
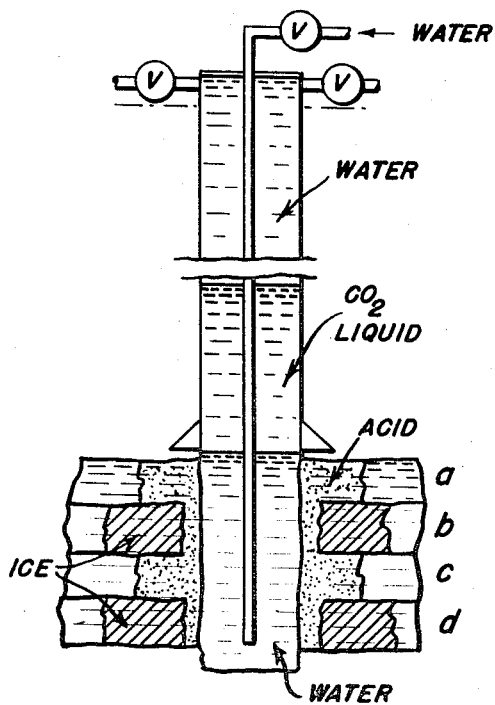
Hugh F. McNamer
INVENTOR.

3,301,326
METHOD FOR SELECTIVELY INCREASING THE POROSITY AND PERMEABILITY OF SUBTERRANEAN GEOLOGIC FORMATIONS
Hugh F. McNamer, c/o The Eline Acid Co., Cut Bank, Mont. 59427
Filed Dec. 31, 1963, Ser. No. 334,790
7 Claims. (Cl. 166—29)

The present invention generally relates to two methods of stimulating a fluid producing well. One method involves the use of ice as a temporary blocking agent to divert injected liquids from the water zone to the oil or gas zone. The other method involves the use of ice as a temporary blocking agent to divert injected fluids from the more permeable zone of a well to the less permeable zone. The ice may be formed in any suitable manner.

Treatment of well formations by the use of acidizing solutions, fracturing techniques or by the introduction of various permeators or formation penetrators is generally a well-known procedure to increase the production from the formation.

As is well-known, all zones in a well may contain some water, with those zones that contain mostly water producing mostly water, while those zones that contain mostly oil will produce mostly oil or may produce all oil. It is one feature of the present invention to provide a method whereby the water in the zones of a well will be frozen in place in order to form an ice block for the purpose of diverting subsequently introduced treating fluids from those zones containing mostly water to those zones containing mostly oil.

Thus, by freezing the water in situ, the penetrating or treating fluid such as acid when forced against the zones will go primarily into the zones with the least water regardless of the permeabilty to acid before freezing inasmuch as the frozen water will act as a greater block in the zone with the most water. The water is frozen in place by introduction of a temperature-reducing agent. For example, liquid carbon dioxide may be introduced through a suitable tube and discharged through a restricted orifice to enable expansion thereof into a gas, whereby the temperature in the borehole will be reduced sufficiently below the freezing point of water to effectively freeze the water in the formation. To illustrate this, if one zone of the well has a pore space eighty percent full of water, freezing this water would reduce the pore space to twenty percent of its former value. Another zone of the well which may be equally porous has its pore space forty percent full of water and forty percent full of oil. In this instance, freezing the water reduces the porous space to sixty percent of its former value or three times that of the zone in which the pore space was eighty percent full of water. Therefore, the permeability will temporarily be higher in the zone which was only forty percent full of water and forty percent full of oil, so that acid or other treating fluids may enter this zone to a greater extent.

One of the techniques which may be used with this feature of the present invention is the concept of using liquid $CO_2$ and forming the solid state thereof known as "Dry Ice," which, in itself, will have some additional plugging effect against the zone containing mostly water.

It is also well-known that a borehole will traverse zones having various degrees of permeability or porosity, and when the treating fluids are introduced into the well, it is desirable to have such treating fluids active to increase the porosity or permeability of the less permeable zones, thereby treating only the zones desired. Various procedures and techniques have been developed for this purpose whereby the more permeable zones of the well are temporarily sealed, thus enabling the treating fluid to be introduced only into the less permeable zones. As an example of such techniques and procedures as well as a discussion of the well-known practice in the industry, reference is made to Patent Nos. 2,801,699, 2,864,448, 2,787,325, 2,661,066 and 2,801,698.

Thus, while the concept of sealing off the more permeable zones of a well while introducing treating fluids to the less permeable zones is generally a known procedure, it is an object of the present invention to provide a novel method of accomplishing this result which is extremely simple in operation, and yet effective for its particular purpose while being generally inexpensive in use. Thus, the present invention involves a method of temporarily sealing or blocking the zones of a well which includes the introduction of water into the borehole, with the water being forced into all zones of the well, and this water then being frozen to form an ice block for all zones of the well. Then the stimulating or treating fluid, such as an acid, may be injected into the well bore and held under pressure so that it will be forced into the formation as the ice block melts. The ice block will melt in the least permeable zones first because it will warm first from the greater mass of rock surrounding it. The treating fluid will thus be forced into the least permeable zone first, the next least permeable zone next, and so on successively so that the permeability of each zone will be increased in the same order.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1, 2, 3 and 4 illustrate successive stages in a procedure for implementing the first method, which is the forming of a temporary diverting ice block in the water producing zone of an oil or gas well.

FIGURES 5, 6, 7 and 8 illustrate successive steps in a procedure for implementing the second method, which is the forming of a temporary ice block to divert treating fluids from a more permeable zone to a less permeable zone.

FIGURE 1 shows liquid $CO_2$ being pumped down tubing 1 out the orifice 2, where it expands to a gas with a great reduction in temperature, thus forming ice 3 of the water in the formation. Ice will also be formed in those parts of the oil zone which contain water. FIGURE 2 shows acid being pumped down the annular space between tubing and casing, while the valve on top of the tubing is closed. Acid is forced into the oil zone only, since the water zone is blocked by ice. FIGURE 3 shows the acid being completely displaced into the oil zone by oil pumped down the annular space. FIGURE 4 shows the well back on production and producing principally from oil zone, since acid or other treating fluid has been placed selectively into the oil zone only. In FIGURE 2 another option would be to continue to pump the $CO_2$ down the tubing as the acid was pumped down the annulus.

FIGURE 5 illustrates a water injection well with zones a, b, c and d of varying permeability. Tubing, annular space, and formation are all full of water. It is customary in this situation to have a packer set between tubing and casing, but this has no effect on the operation of the second method. FIGURE 6 shows liquid $CO_2$ at zero degrees F. spotted against the face of the formation and held there by closing valves at the head of the tubing and casing. This position is held long enough to freeze water adjacent to the bore hole in all zones of the formation. Next, acid is spotted against the face of the formation, as illustrated in FIGURE 7, by pumping a measured quantity of acid down tubing and allowing fluids in the annulus to circulate up the hole. FIGURE 8 shows that as ice in the formation melts due to heat of the formation, those zones of least porosity and least permeability will warm up first, causing acid to penetrate them first and to a greater degree. Reaction of the acid with the formation increases the permeability and porosity of the latter, so that the end result is that the more impermeable, least porous (tighter) zones are subject to more treatment from the acid. The illustration is of an injection well, but the same method of selective stimulation would work equally well on a producing well.

Various freezing agents may be employed other than liquid $CO_2$. For example, liquid nitrogen or the like could also be employed, as long as the freezing agent will reduce the water below freezing temperature for forming an ice block. When the term acid is used, it is meant to imply the use of various treating fluids, stimulants, fracturing fluids, surfactants, permeators, penetrators or the like. By using the water already in place, or the water used in the flooding operation, the liquid carbon dioxide then will effectively freeze the water and will itself be easily displaced by the treating fluid. Various procedures well known may be employed for retaining the various liquids under pressure during operation of the method, for effectively maintaining contact of the carbon dioxide with the formation, and for maintaining the treating solution in contact with the formation.

The process of the present invention is useful in treating injection wells as well as production wells and can be advantageously employed in open hole completions, cased through completions and slim hole tubingless completions as will now be apparent to those skilled in well service technology.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method for treating subterranean geologic formations in an area traversed by a well borehole in order to selectively increase porosity and permeability of predominantly oil and gas producing zones in the area while leaving the porosity and permeability of predominantly water producing zones substantially little affected, comprising the steps of: lowering the temperature of the formation in said area sufficiently to freeze water in said predominantly water producing zones to define temporary ice blockage in said predominantly water producing zones, displacing a quantity of fluid into said area of the borehole, said fluid having as an essential characteristic the ability to increase porosity and permeability of said geologic formations in said area through chemical reaction therewith; pressurizing said fluid in said area sufficiently to force said fluid into said predominantly oil and gas producing zones, while said temporary ice blockage prevents substantial penetration of said fluid into said predominantly oil and gas producing zones, said fluid being insufficiently pressurized to fracture said geologic formations in said predominantly oil and gas producing zones, whereby the porosity and permeability of the primarily oil and gas producing zones is increased and the porosity and permeability of the predominantly water producing zones remains substantially the same as it was prior to treatment of said area.

2. The method of claim 1 wherein the step of lowering the temperature of the formation in said area comprises: introducing liquid carbon dioxide into the well borehole through a tube having a restricted orifice and expanding said liquid carbon dioxide through said orifice, thereby effecting vaporization of the carbon dioxide.

3. The method of claim 2 wherein the step of displacing a quantity of fluid into said area comprises injecting acid into the well borehole.

4. A method for treating subterranean geologic formations in an area traversed by a well borehole in order to selectively increase the porosity and permeability of less porous zones having greater heat capacity while leaving less affected the porosity of more porous zones having lesser heat capacity, comprising the steps of: introducing a liquid into said area including said more porous and less porous zones, said liquid penetrating further into the former than the latter because of the porosity disparity among said zones; lowering the temperature of the formation in said area sufficiently to freeze said liquid in said more porous and less porous zones to define temporary ice blockage of greater extent in said more porous zones and temporary ice blockage of lesser extent in said less porous zones whereby the degree of porosity of said zones is temporarily inverted; displacing a quantity of fluid into said area of the borehole, said fluid having as an essential characteristic the ability to increase porosity and permeability of said geologic formations in said area through chemical reaction therewith; pressurizing said fluid in said area and maintaining pressure thereon at least until the formation less porous zones having greater heat capacity thaws through said temporary ice blockage of lesser extent and said fluid has been forced by said pressure into said less porous zones, the temporary ice blockage of greater extent preventing as extensive penetration of said fluid into said more porous zones; said fluid being insufficiently pressurized to fracture said geologic formations in said area whereby the porosity and permeability of the less porous zones is increased and the porosity and permeability of the more porous zones is little greater than it was prior to treatment of said area.

5. The method of claim 4 wherein the step of introducing a liquid into said area comprises displacing water into said area.

6. The method of claim 5 wherein the step of lowering the temperature of the formation in said areas sufficiently to freeze said liquid comprises: introducing liquid carbon dioxide into the well borehole through a tube having a restricted orifice and expanding said liquid carbon dioxide through said orifice, thereby effecting vaporization of the carbon dioxide and freezing of said water.

7. The method of claim 6 wherein the step of displacing a quantity of fluid into said area comprises: injecting acid into the well borehole.

References Cited by the Examiner
UNITED STATES PATENTS

| | | | |
|---|---|---|---|
| 1,342,780 | 6/1920 | Vedder | 166—21 |
| 2,033,561 | 3/1936 | Wells | 166—39 X |
| 2,731,414 | 1/1956 | Binder et al. | 166—10 X |
| 2,777,679 | 1/1957 | Ljunstrom | 166—25 |
| 2,801,698 | 8/1957 | Bond | 166—29 X |
| 2,864,448 | 12/1958 | Bond et al. | 166—39 X |

CHARLES E. O'CONNELL, Primary Examiner.

JACOB L. NACKENOFF, Examiner.

S. J. NOVOSAD, Assistant Examiner.